(12) United States Patent
Kalkunte

(10) Patent No.: US 6,249,886 B1
(45) Date of Patent: Jun. 19, 2001

(54) COMPUTER SYSTEM AND COMPUTER IMPLEMENTED PROCESS FOR PERFORMING USER-DEFINED TESTS OF A CLIENT-SERVER SYSTEM WITH RUN TIME COMPILATION OF TEST RESULTS

(76) Inventor: Ramsesh S. Kalkunte, 98 Burlington St., Lexington, MA (US) 02173

( * ) Notice: Subject to any disclaimer, the term of this patent is extended or adjusted under 35 U.S.C. 154(b) by 0 days.

(21) Appl. No.: 08/953,582

(22) Filed: Oct. 17, 1997

(51) Int. Cl.[7] ................................................... H02H 3/05
(52) U.S. Cl. ................................. 714/47; 714/38; 714/39
(58) Field of Search ................................ 714/47, 46, 39, 714/26, 25, 745, 741, 45, 4, 32, 38, 48

(56) References Cited

U.S. PATENT DOCUMENTS

| | | | |
|---|---|---|---|
| 5,228,137 | * 7/1993 | Kleinerman et al. | 395/500 |
| 5,459,837 | * 10/1995 | Caccavale | 395/184.01 |
| 5,734,871 | * 3/1998 | Kleinerman et al. | 395/500 |
| 5,812,780 | * 9/1998 | Chen et al. | 395/200.54 |
| 5,819,066 | * 10/1998 | Bromberg et al. | 395/500 |
| 5,838,919 | * 11/1998 | Schwaller et al. | 395/200.54 |
| 5,875,119 | * 2/1999 | Bauman et al. | 364/551.01 |
| 5,881,237 | * 3/1999 | Schwaller et al. | 395/200.54 |
| 5,913,036 | * 6/1999 | Brownmiller et al. | 395/200 |
| 5,922,079 | * 7/1999 | Booth et al. | 714/26 |

* cited by examiner

Primary Examiner—Norman M. Wright
(74) Attorney, Agent, or Firm—Wolf, Greenfield & Sacks, O.P.C.

(57) ABSTRACT

The present invention provides a client application to measure the performance, reliability or security of a system under test, based on user-defined loads to be applied to the system under test. In the present invention, a test may be performed simultaneously on several servers and applications. As the test progresses, results are compiled during run time and visual feedback is provided. By allowing a user to define the test, and by providing run time compilation of results, the present invention can be used for capacity planning. Stopped or truncated tests still provide relevant results. The application also may allow acceptance criteria to be analyzed during the run time of test. Finally, the number of users simulated may be regulated by the application.

8 Claims, 15 Drawing Sheets

```
typedef struct
    {
    char    CMD[10];        /* Action specifier: Operation type     */ —100
    int     cmd;            /* Action specifier: As Integer         */ ⎫
    int     Par1;           /* Number of operations to perform      */ ⎪
    int     Par2;           /* Subject Size (for adds and updates)  */ ⎬ 104
    int     Par3;           /* Subject Size randomness              */ ⎪
    int     Par4;           /* Body Size (for adds and updates)     */ ⎪
    int     Par5;           /* Body Size randomness                 */ ⎭
    char    Par6[20];       /* Attachment file #1 or GP buffer      */ —106
            . . .
    char    *formName;  — 108
    char    *query;     —110 char    *textField1; —112
    char    *tfValue1;   —114
            . . .
    char    *numberField1; —116
    double  nfValue1;    —118
            . . .
    char    *timeField;  —120
    char    *timeFieldValue; —122 char    *attach1;  —124
            . . .
    char    *viewName; —126 char    *noteID;       —128
    char    *serverName;   —130
    char    *databaseName; —132

} CMDentry;
```

FIG. 5

```
typedef struct
{
    int         ThreadNo;          /* Thread Number                                        */  ~200
    DWORD       ThreadID;          /* Thread ID from CreateThread routine                  */  ~202
    int         TransType;         /* Trans type. Used in ProcessStats                     */  ~204
    STATUS      error;             /* return code from API calls                           */  ~206
    DWORD       OPS;               /* Number of operations                                 */  ~208
    int         cmd;               /* Command being executed                               */  ~210
    int         REWCNT;            /* How many more iterations to go ?                     */  ~212
    int         INDEX;             /* Where are we in the script file                      */  ~214
    DWORD       TransTime;         /* Transaction's clock tick accumulator                 */  ~216
    stats       *StatsPtr;         /* Pointer to relevant stats table                      */  ~218
    HANDLE      ThreadHandle;      /* Handle to this thread                                */  ~220
    int         ExitSignal;        /* Thread specific termination semaphore                */  ~222
    int         FOUNDSTRING;       /* Flag indicating success on buf search                */  ~224
    int         DOCOMMAND;         /* Semaphore which enables cmd execution                */  ~226
    DWORD       BeginTime;         /* Used as a GetTickCount() accumulator                 */  ~228
    DWORD       CreateTime;        /* Time when connect is initiated                       */  ~230
    DWORD       ConnectTime;       /* Time to Connect to socket                            */  ~232
    DWORD       SendTime;          /* Time to send the request out                         */  ~234
    DWORD       ReadTime;          /* Time to get the first byte back                      */  ~236
    DWORD       FinishTime;        /* Time to get last byte back                           */  ~238
    char        *buffer;           /* Buffer used to index data from conn                  */  ~240
    FILE        *ThLOG;            /* Thread specific logging                              */  ~242
    boolean     recordedMode;      /* to set what mode we are in                           */  ~244
    char        dbuffer [9];       /* Buffer to hold Date Value                            */  ~246
    char        tbuffer [9];       /* Buffer to hold Time Value                            */  ~248
    CMDentry    *commandStruct;    /* index to all relevant details of cmd                 */  ~249
} Context;
```

FIG. 6

```
typedef struct
    {
    int        FirstTime;      /* 360 */
    DFLOAT     TotalTime;      /* 362 */
    DFLOAT     TotalSqTime;    /* 364 */
    DWORD      NumberOfTrans;  /* 366 */
    DFLOAT     Average;        /* 368 */
    DFLOAT     StdDev;         /* 370 */
    DFLOAT     Throughput;     /* 372 */
    int        Min;            /* 374 */
    int        Max;            /* 376 */
    int        Last;           /* 378 */
    int        LTVAL1;     ⎫
    int        LTVAL2;     ⎪
    int        LTVAL3;     ⎬ 380
    int        LTVAL4;     ⎪
    int        LTVAL5;     ⎪
    int        GTVAL5;     ⎭
    }stats;
```

FIG. 10

COMPUTER SYSTEM AND COMPUTER IMPLEMENTED PROCESS FOR PERFORMING USER-DEFINED TESTS OF A CLIENT-SERVER SYSTEM WITH RUN TIME COMPILATION OF TEST RESULTS

FIELD OF THE INVENTION

The present invention is related to computer systems and methods for measuring the performance, reliability and security of computer systems under simulated user conditions.

BACKGROUND OF THE INVENTION

A difficult problem in designing a client-server computer system is specifying the capacity of the server based on predicted client loads. This specification is used to design the system to support current user needs and to be scalable to meet future user needs. Without good prediction of application performance under projected loads, the system may have insufficient capacity, which can reduce productivity. Alternatively, too much equipment may be purchased and human resources may be allocated in excess of actual requirements.

The measurement of performance and reliability of a system often is characterized as benchmarking. Many applications are available which for benchmarking a variety of computer systems. Benchmarking applications typically use tests which are designed to be performed individually on several servers and applications, in order to compare the relative performance of those systems. Additionally, such benchmarking applications typically run the tests over a fixed period of time. The user has to wait until the test is completed to know about the performance of the system under test. Generally, the results one system are not considered accurate unless the test is completed.

SUMMARY OF THE INVENTION

The present invention provides a client application to measure the performance, reliability or security of a system under test, based on user-defined loads to be applied to the system under test. In the present invention, a test may be performed simultaneously on several servers and applications. As the test progresses, results are compiled during run time and visual feedback is provided. By allowing a user to define the test, and by providing run time compilation of results, the present invention can be used for capacity planning. Stopped or truncated tests still provide relevant results. The application also may allow acceptance criteria to be analyzed during the run time of test. Finally, the number of users simulated may be regulated by the application.

Accordingly, one aspect of the present invention is a process for testing a computer system. The process involves issuing, over a period of time, requests to the computer system. Responses from the computer system are received. Performance and reliability of results of the responses from the computer system are monitored. At intervals during the period of time, a summary of the performance and reliability results is compiled and displayed to the user. Acceptance criteria related to the performance and reliability results may be established. A user may be notified when the performance and reliability results fail to meet the acceptance criteria. A plurality of users may be simulated to issue the requests to the system. Simulation of one of the plurality of users may be terminated when certain conditions occur in connection with the responses to the requests issued by the simulated user.

BRIEF DESCRIPTION OF THE DRAWINGS

In the drawings,

FIG. 5 is an illustration of a data structure representing a command to be applied to the system under test;

FIG. 6 is a data structure representing contextual information for each simulated user;

FIG. 10 represents a data structure for storing statistical information for transactions of a certain type performed on the system under the test;

DETAILED DESCRIPTION

The present invention will be understood more completely through the following detailed description which should be read in conjunction with the attached drawing in which similar reference numbers indicate similar structures.

Figure 1:
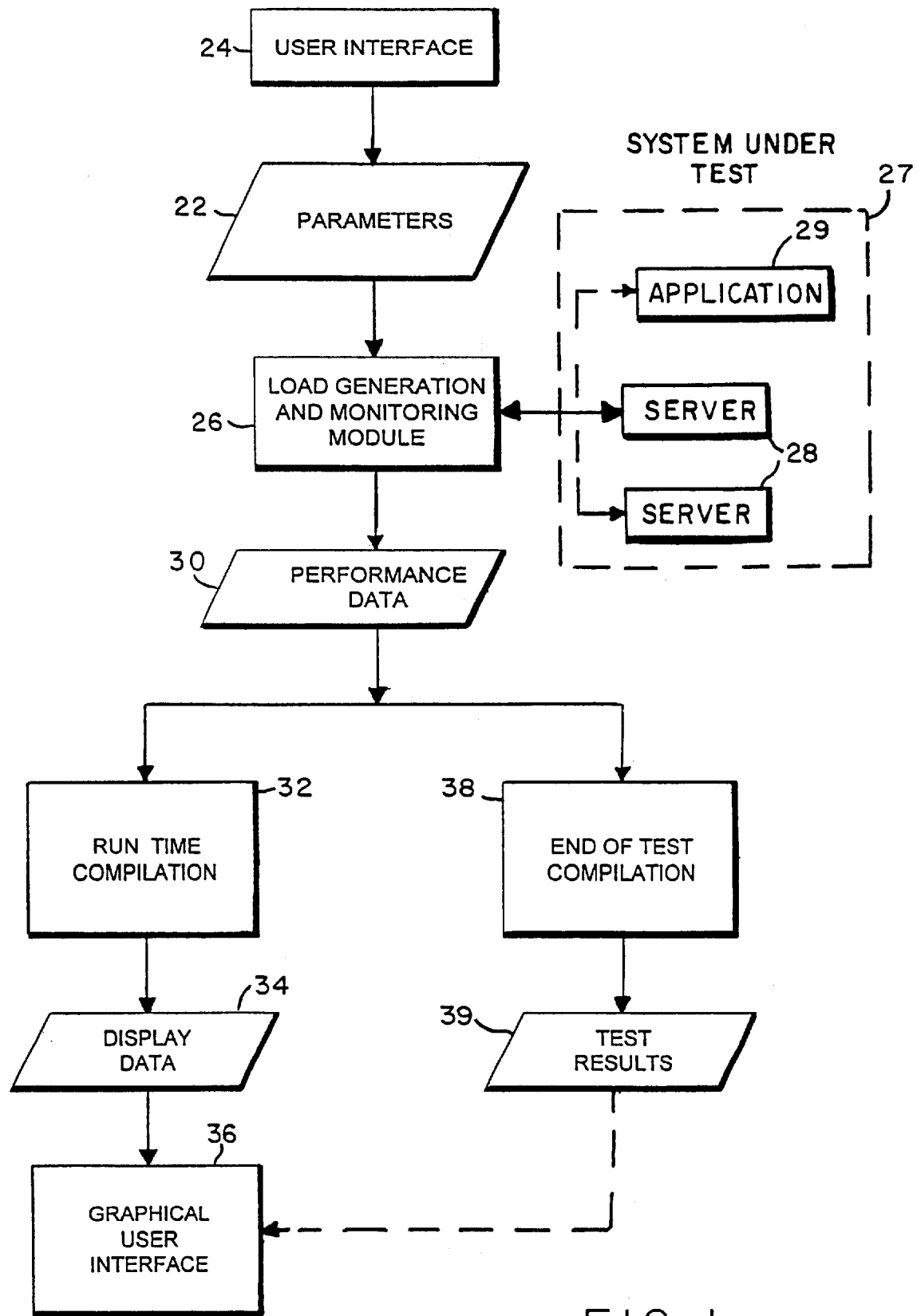
FIG. 1 illustrates primary modules of a computer program in one embodiment of the present invention.

FIG. 1 illustrates generally one embodiment of the present invention. A user may define parameters that specify the load to be applied to the different servers, as indicated at 22. These parameters may be defined, for example, through a graphical user interface 24 or through script files, as described below. The parameters are read by a load generation and monitoring module 26. This module issues commands to the system under test 27 to apply the load specified by the parameters 22. The system under test may include one or more applications 29 and/or one or more servers 28. The module 26 monitors the time between issuance of the command and receipt of a corresponding response, and whether the command was successfully completed to provide performance data, as indicated at 30. This performance data is collected during run time using a run time compilation module 32 to generate display data 34 to the user through a graphical user interface 36. At the end of a test another compilation module 38 generates final test results 39.

Figure 2:
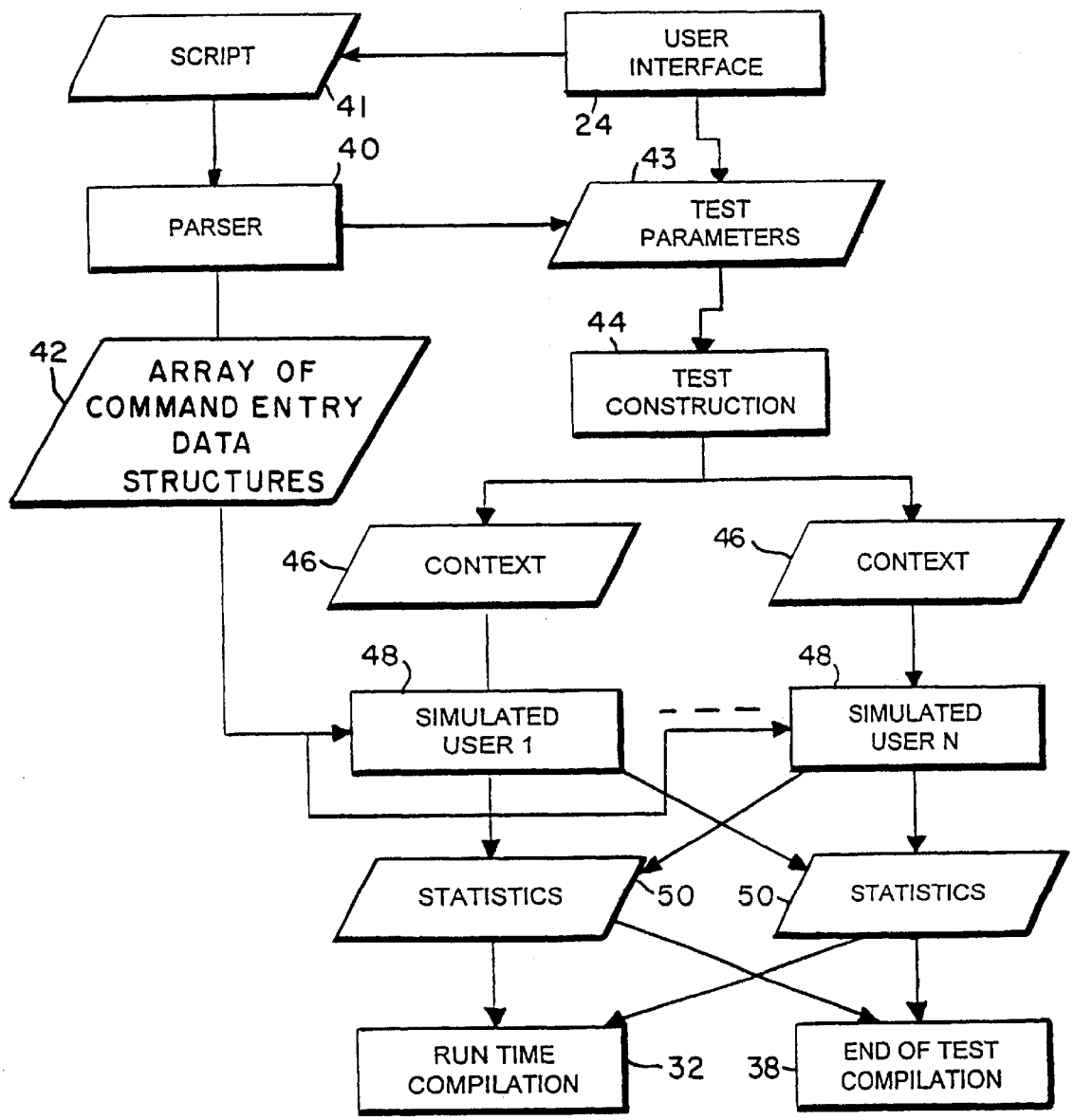
FIG. 2 illustrates in more detail the structure of the load generation and monitoring module 26 of FIG. 1.

FIG. 2 illustrates more detail of one embodiment of the load generation and monitoring module 26. In this embodiment, the test is defined by script files 41 and test parameters 43. The scripts 41 are processed by a parser 40 to generate an array of commands, wherein each command is represented by a command entry data structure 42, described in more detail below. The use of the command entry data structures allows a test to be defined to be run on several servers and applications. Other test parameters 43 specify a number of simulated users, information about the system to be tested and other information about the system under test. The other information may include a number of repetitions of the test to be performed, and an offset in the array of commands 42 from which the repetition should start.

A test construction module 44 receives the array of command entry data structures 42 and the test parameters 43, and spawns a processor or thread for each user to be simulated, as noted at 48. Each simulated user has an associated context data structure 46 which contains data relevant to simulating a single user according to the test specified by the test parameters 43 and the array of command entry data structures 42. Each simulated user sends commands to the server (not shown) and monitors the response. Results of each response for each kind of operation are saved in statistics data structures 50, which are created for each possible kind of operation which can be applied to the system under test. For example, for testing an HTTP (Web) server, separate data structures for statistics about GET operations and POST operations may be provided. The run time compilation module 32 and the end of test compilation module 38 process the statistics data structures 50, as described in connection with FIG. 1.

In one embodiment, the simulated user modules 48 are processes or threads spawned by a main process which performs the functions of the parser 40, test construction 44 and the run time and end of test compilation modules 32 and 38. In this main process, after the user test processes or threads 48 are spawned, the run time compilation module periodically polls the statistics data structures 50 that are being updated by the simulated user modules 48. If one of the simulated users indicates that the test should stop, or if all the simulated users terminate or complete the test, the end of test compilation is performed by module 38. The graphical user interface 36 (FIG. 1) periodically polls the results output by the run time compilation module 32 to generate a display.

The present invention is suitable for use with any client-server protocol or application programming interface or combination thereof through which an application may send a command and receive a response from one or more servers or applications. For example, electronic mail, HTTP (Web) servers, and Lotus Notes domino servers, among others, and combinations thereof may be tested using the present invention. Clearly, the invention is not limited to these specific servers. The testing application should be executed on a computer that has a communication pathway to the system that has the maximum bandwidth available to, and shared by, all likely clients. Also the testing application should not perform substantial input and output other than the communication traffic being tested, because such other communication traffic may affect the accuracy of the results.

The performance of the system under test that is measured includes the amount of time it takes to successfully receive a response after issuing a request to a system for different kinds of operations. This performance data is processed to provide information regarding the latency and throughput of the system. In contrast to other benchmarking systems, this information is provided during run time of the test so that the impact of different patterns of access by different users over time can be viewed.

Figure 3:
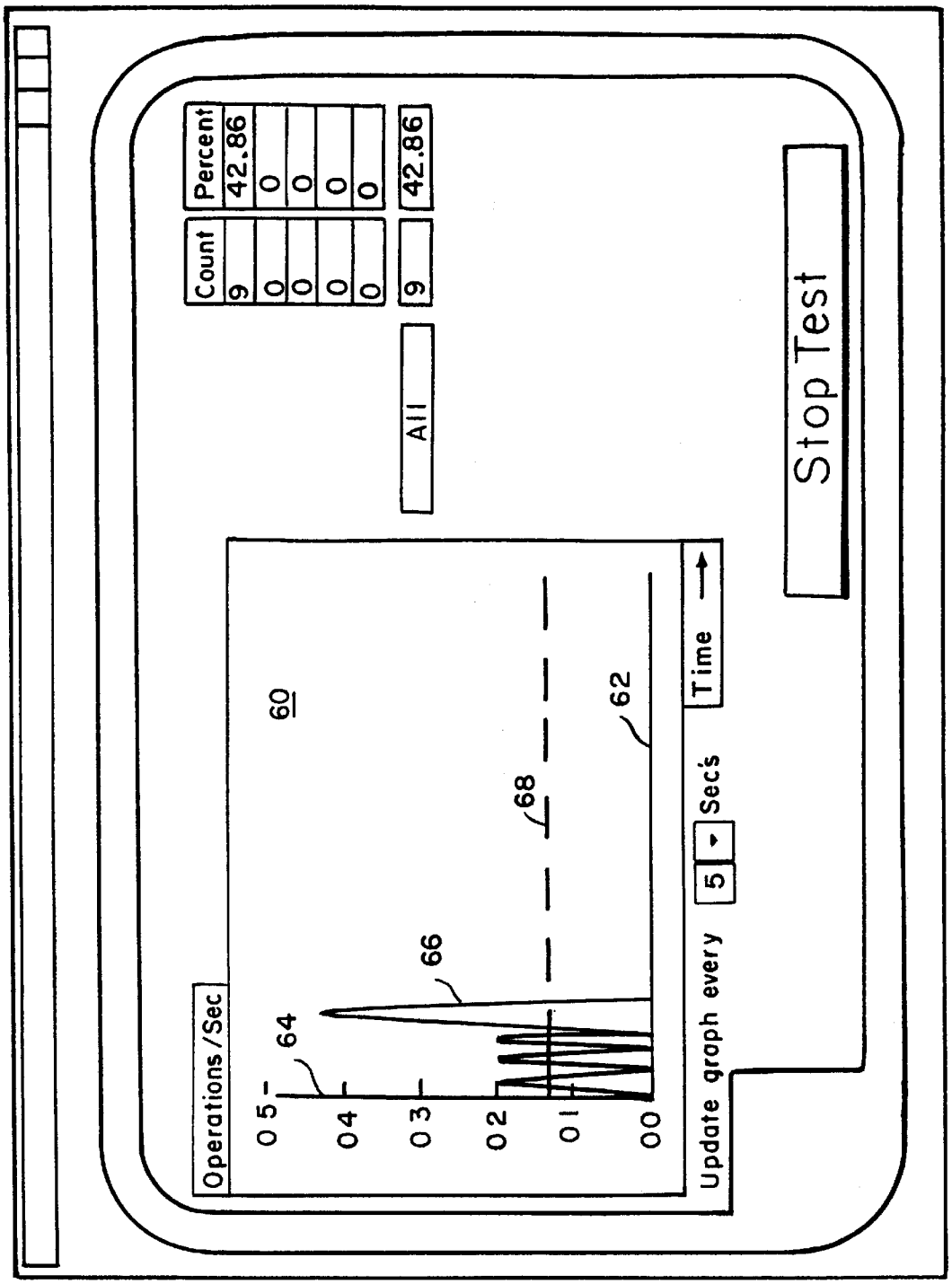
FIG. 3 is a sample display for a graphical user interface providing run time compilation of results.

An example run time display is shown in FIG. 3. This display includes a graphical area 60 which indicates over time (on the abscissa 62), the number of operations per second performed by the system (on the ordinate 64). This display, updated every five seconds in this example, shows results from a test in which a large page was loaded from a web server to a web browser on a very slow modem line. The solid line 66 illustrates the instantaneous measurements of throughput, while the dashed line 68 through the center of the graph illustrates the mean or average throughput.

How the user specifies parameters for a test, in one embodiment of the invention, using the graphical user interface and/or a script will now be described. As discussed above, in one embodiment of the invention, a user may define a load to be applied to a system under test by using a script file and by inputting other data representing test parameters. Other mechanisms for providing data to the testing application also may be used. The test parameters specify the number of users to simulate, information about the system to be tested, and other aspects of the test itself.

A script file may be used to specify directives or commands which are interpreted by the load generation and monitoring module 26 into a command entry data structure, described in more detail below in connection with FIG. 6, that is used to generate the load applied to the system.

There are several kinds of input directives or commands, such as simple directives, implied directives, native commands, name/value pairs and run time management directives. An application may use one or more of these kinds in the same script file. It should be understood that these kinds of commands are merely examples for the purpose of illustration and are not intended to be limiting of the present invention.

A simple directive has a form which a user intuitively associates with a common type of operation. An example of such a definition is an "OPEN" command. The OPEN command in the context of a database implies that a connection to a data source is opened. A simple directive has a fixed number of steps to be executed by the load generation and monitoring system to implement its functionality.

An implied directive is a command which implies attachment of data values to specific settings which the user has set. An "ADD" command for a Notes database is an example of such a command. This command is used to add notes to the Notes database. Its syntax has the form: "ADD #Notes #Fld1St #Fld1Rand #Fld2St #Fld2Rand." This command works against a form which has 2 fields, namely Field1 and Field2. As an example, a script might include the directive: "ADD 10 100 10 1000 100." In this example, 10 notes will be added to the Notes database. Each note will have a first field with a random length of anywhere from 100 to 110 bytes, and a second field with a size of anywhere from 1000 to 1100 bytes, to be determined at random for each note, by each simulated user.

A native command is a command which is what a user would implement using a programming language, such as the Structured Query Language (SQL). SQL commands can just be entered in their entirety into the script file. In use, the script should include a directive prior to the native command that establishes any required initialization prior to the native command. For example, the script also should include a command to open a connection to the database. It can be assumed that the user has supplied valid SQL statement. For native commands, the load generation and monitoring module supplies the entire native command to the system under test.

A name-value pair based command is used to specify commands with specific values for an address and a stimulus. For example, if a certain value needs to be changed from X to Y in the context of a server, this kind of directive should be used. A name-value pair directive can address any number of data elements targeted for such an operation. An simple example of a name-value pair directive is the following:

nvupdate noteID=0045A&formName=SampleForm&textField1=
TextField1&tfValue1=testing123&timeField=NoteTime In this example, the "nvupdate" command updates a note (e.g., note 0045A) in a Notes database. The payload of the "nvupdate" command is supplied as name-value pairs, each pair separated by an ampersand. This command sets up a write operation to a form called "SampleForm." The value "testing123" is written into the text field called "TextField." The current time data from the Notes server is written into the time field called "NoteTime."

Run time management directives are directives used to manage experiments. For example, an experiment may require repetition, or may terminate under certain conditions, or may be paused temporarily. Some example run time management directives are: PAUSE, REWIND, RUNFOR, SEARCH, PARSE, EXIT and TERMINATE. The PAUSE directive can take a set of parameters, indicating the length of the pause. For example, one might want to pause an experiment randomly between 0 and 2 seconds. The REWIND can indicate that all following commands should be repeated a user-defined number of times. Similarly, a RUNFOR directive can indicate an amount of time for which the experiment should be run. The SEARCH directive can be used to determine whether the results include a user-defined string. This directive is useful for detecting server errors, for example. An EXIT directive can be used to exit the user from the test, for example if the user encountered an error or some other abnormal event. Similarly, the test can be terminated by the TERMINATE directive.

A sample script file for a Notes database is the following:

pause 1 3
add 10 15 10 1000 50
rewind 50
add 3 100 200 2500 3000
read 5
update 1 50 100 4000 5000
delete 1

A sample script file for a Web (HTTP) server is the following:

GET 1 http://www.abcd.com
REWIND 5
PAUSE 5
GET 1 http://www.xyz.com
PAUSE 3
GET 1 http://www.tech.com
PAUSE 7
GET 1 http://www.efgh.com
PAUSE 3
GET 1 http://www.ijkl.com A script file containing these various directives is processed by a parser, shown in FIG. 2, to generate an array of command entry data structures, described below in connection with FIG. 5. In general, each simulated user keeps track of its position in the array and uses the corresponding command entry data structure to issue a request to the server. The position of any "rewind" directive may be stored globally, whereas the number of repetitions to be performed by any simulated user is stored locally.

The script file may be created manually using any standard text editor. Additionally, it is possible to create a file by recording commands output by a user during actual use of the system. This file would not need to be processed to create a command entry data structure, as described below, but could be processed directly by each simulated user for the test. Accordingly, processing by a simulated user of a recorded file is different from the processing of a script file.

The process performed by the load generation and monitoring module and each user test thread in one embodiment of the invention will now be described in connection with FIGS. 4–7. This process gives the appearance of an interactive presentation of results to the user.

Figure 4:
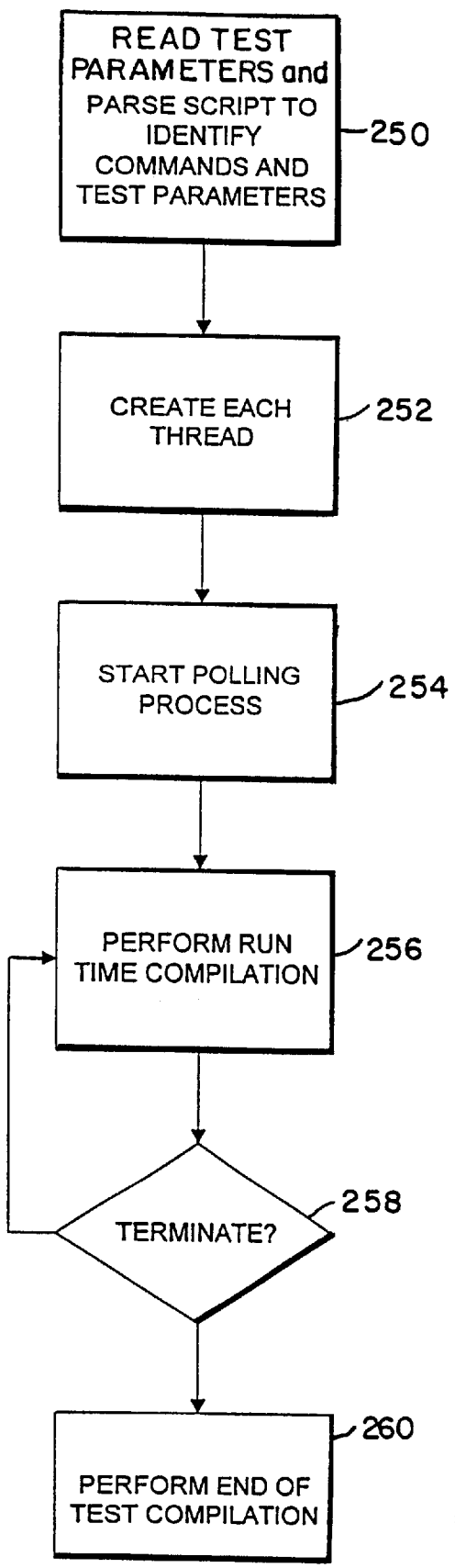
FIG. 4 is a flow chart describing the main process of the load generation and monitoring module 26.

Referring now to FIG. 4, the testing process generally begins by reading test parameters in step 250. Such test parameters may indicate the number of simultaneous users, specification of the database or server of the system under test, information about the schema of the database, and other specifications of the system under test. This information will vary depending upon the type of system to be tested, however, the specification of a number of users will likely be common among implementations. Any script file also is parsed to produce the array of command entry data structures. A count of the total number of commands for each type, and the total number of commands also may be determined. A time value also may be stored for this test to indicate a time at which the test started.

An example command entry data structure for a Notes database command is shown in FIG. 5. This data structure may vary depending upon the system under test and the kinds of operations to be applied to the system. One of these data structures may be formed for each command in the script file. However, a rewind command need not be stored. The type of command is represented as a character string, as indicated at 100, and a corresponding integer, as indicated at 102. A number of parameters 104 also may be provided. These parameters may indicate the number of operations to perform as well as the size and randomness of the subject and body of a message to the server. These values are used primarily for implied directives. Additional parameters also may be provided to specify buffer or file names, as indicated at 106. A form name may be stored at 108, and a view name may be stored at 126. These values are particular to a Notes database. A query, such as a set of key words for a full text search, maybe stored as indicated at 110. Various text, number and time field names and associated values also may be used as illustrated at 112 through 122. The content of these fields may be specified using name-value pairs. The generic fields allow parameters of virtually any commands to be specified easily using name-value pairs. Other attachments also may be indicated at 124. An identifier for the note to be accessed is provided at 128, and identifiers for the server and database are provided at 130 and 132, respectively.

Turning again to the description of FIG. 4, given the test parameters and the array of command entry data structures, a thread (or another process) is created and initialized in step 252 for each of the specified users to be simulated. Time values may be stored at the time the first and last threads are created. The main process then starts a polling process, as indicated at step 254, which polls the statistics data structures 50 periodically, e.g., every millisecond, as indicated at 256, to generate the compiled run time results. If a thread indicates that the process should terminate, as determined in step 258, the end of test compilation of results may be performed in step 260. A time value also may be stored at this time to indicate that the test has ended.

As stated above, each simulated user created by the main process in step 252 has a context data structure which holds all relevant information for the test only for that user. That is, this data structure carries per thread or per process context for various operational functions and defines a set of data elements that are self contained during run time. Referring now to FIG. 6, the context data structure indicates the thread number 200 and the thread ID generated by the create thread process. A transaction type is indicated at 204, which represents the kind of operation being performed on the server. For example, in a mail program, this transaction may be "send" or "reply." Each transaction type can have an associated integer value. An error field 206 is provided to handle return codes from application programming interface calls. The number of times a specified operation, i.e., the current operation, is to be performed is indicated at 208.

The command currently being executed, as represented by an integer, is indicated at 210. For each kind of server, each command to be tested may have an associated integer value. The command may be different from the transaction or operation type. For example, "send" and "reply" operations in electronic mail are both "SNMP" commands. The number of iterations of the script file that remain to be performed by the thread is specified by a "rewind" value 212. The command that the thread currently is processing in the array of commands is indicated by an index value 214. A transaction time 216 is used to store the system time sampled upon the issuance of a request, and elapsed time for the command sampled upon a receipt of a response.

A pointer to a statistics data structure is stored at 218. This pointer corresponds to the data structure for results for the current kind of operation being performed. A handle to the hread is listed at 220. An integer 222 is used to represent a thread specific termination semaphore that can be set by the main process or the thread to terminate the threads. The success of a search on content of a buffer is provided at 224. A semaphore which enables the current command to be processed is stored at 226. Various timing information also is stored. For example, the begin time 228 represents the time at which the thread was initiated. The time when a connect to a server is initiated is stored at 230. The time to complete the connection is stored at 232. The time a request is actually sent is stored at 234. The time a first byte is received 236, and the time a last byte is received 238 also may be stored.

The pointer 240 to the buffer which stores the received data is tracked. A log file name also may be stored as indicated at 242. This file may be used to store, on a per-thread basis, each response from the system under test to this thread. These actual responses allow for the threads to be compared to each other. The mode 244 in which the command is operating, either using a script or a recorded file, is stored. Buffers are also provided to store date and time values, as indicated at 246 and 248. Finally, the pointer to the command data structure is also stored at 249.

Figure 7:
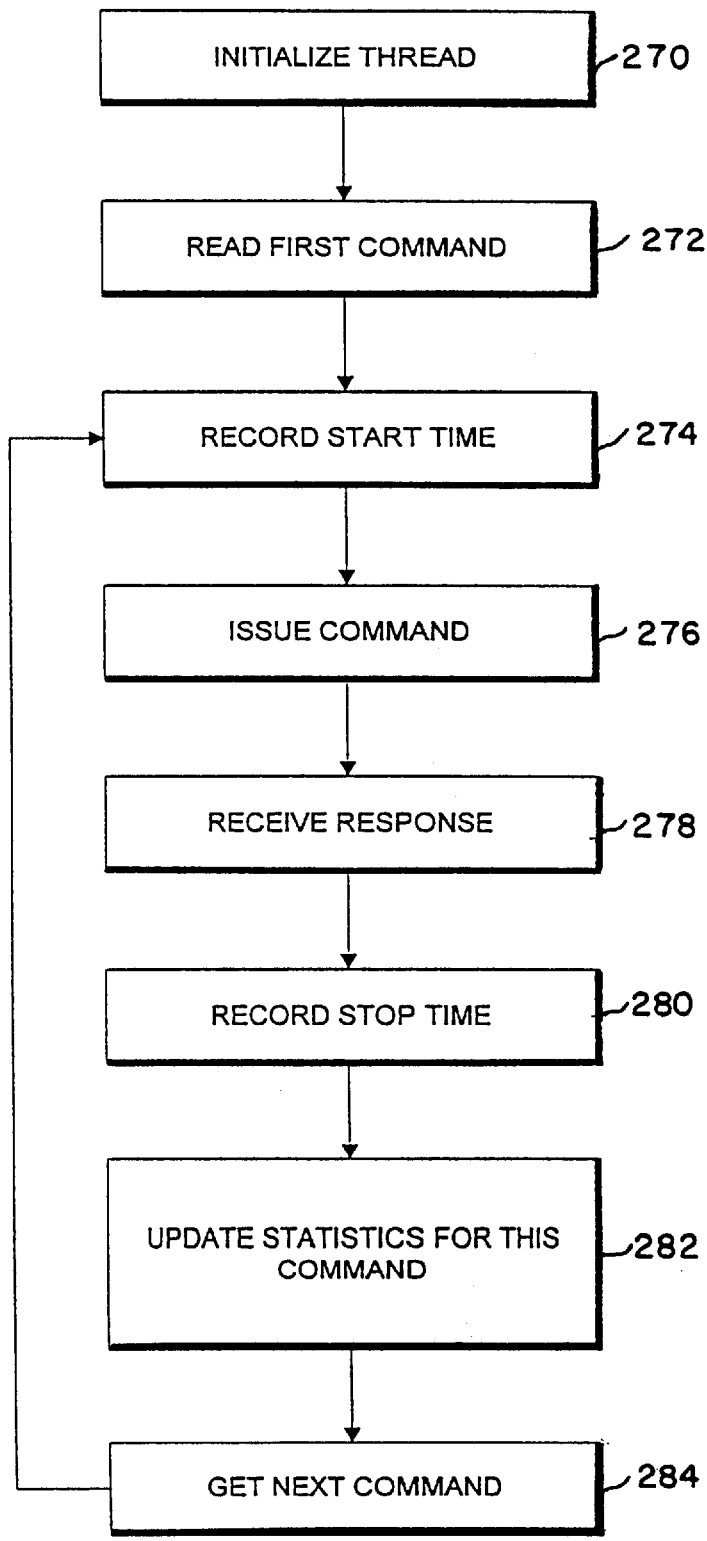
FIG. 7 is a flow chart describing the process performed for each simulated user.

The process performed by each thread now will be described in connection with FIG. 7. Each thread first initializes its process in step 270. This initialization involves setting the index 214 to the array of commands to the first command and the rewind count 212 to the value associated to any "rewind" command in the script. The first command from the script is then read in step 272. A timer is then read and the start time is recorded at 216 (FIG. 6) in step 274. The command is then issued to the server in step 276. At this time, any random variations in the command, as specified by the subject and body size and randomness values (104 in FIG. 5) are determined. The test may be sampled from a text file for this purpose. Upon receipt of the results from the server in step 278, the transaction end time is recorded in step 280. Time recorded in the other fields (228 to 238 in FIG. 6) may be determined by sampling the system clock during these two steps. The statistics data structure for the kind of command issued is updated in step 282, as described below in connection with FIGS. 8 and 9.

The next command is then accessed in step 284. If, for example, an implied directive of "ADD 10 . . . " was received, the "OPS" value 208 would be decremented. Otherwise, the index value 214 would be incremented and the next command entry would be read. If, in the results achieved in step 278, an error occurs, or if no further commands are available in the script file, the process may terminate. Otherwise the process of steps 274 to 284 repeats.

Figure 8:
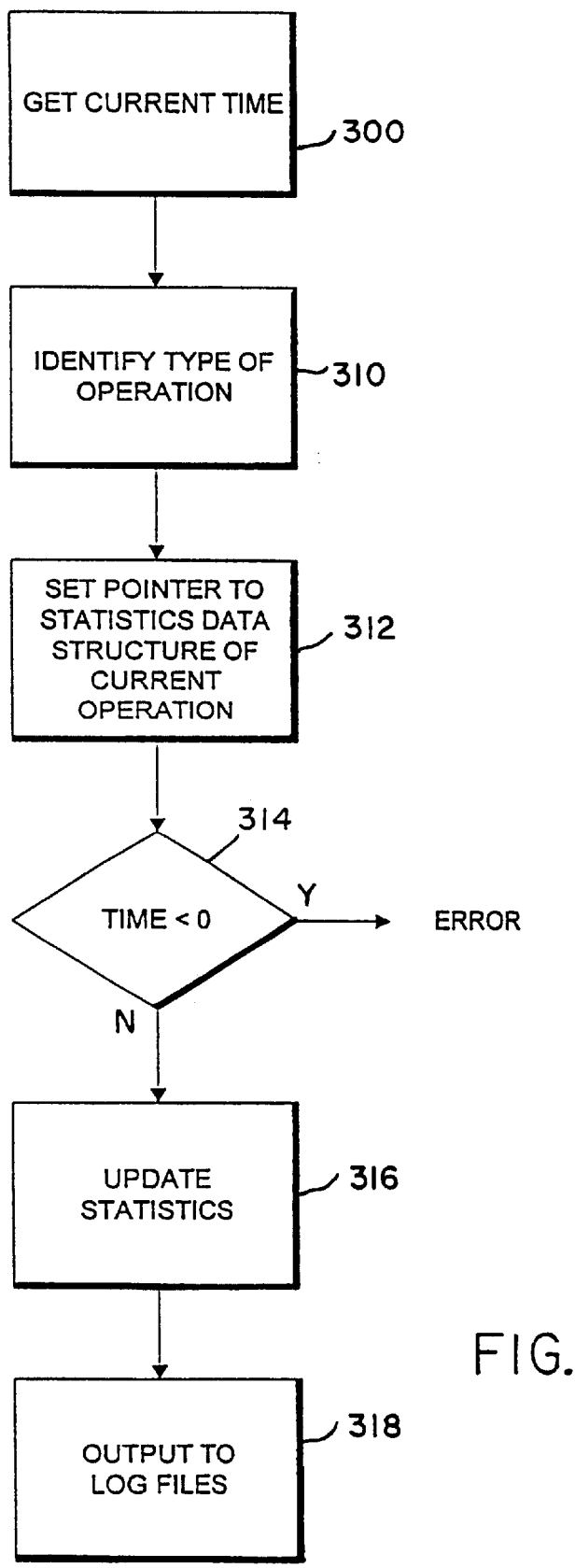
FIG. 8 is a flow chart describing the process of calculating and storing the transaction time for a given operation performed by a simulated user.

The process of recording the stop time and updating the statistics in steps 280 and 282 in FIG. 7 will now be described in more detail with connection with FIGS. 8 and 9. In FIG. 8, the transaction time field 216 is updated in step 300 based on the difference between the current system time and the system time stored in field 216 at the start of the transaction. Next, based on the transaction type, as determined in step 310, one of several operations could be performed. Generally, statistics are stored separately for each operation to be performed on the database. Accordingly, there is a statistics data structure for each operation, which is accessible by all threads. Therefore, for each operation, the statistics pointer (218 in FIG. 6) is set to the statistics data structure for the current command in step 312. The validity of the transaction time is then checked in step 314. If the transaction time is valid, e.g., greater than zero, then the statistics data structure is updated in step 316, as described below in connection with FIGS. 9 and 10. A log file then can be updated in step 318.

How the statistics data structure for the current type of operation is updated will now be described in connection with FIGS. 9–10. Referring first to FIG. 10, the data structure that captures statistical data values for each type of operation during the test is shown. This data structure represents, at 360, whether the statistics data structure has been updated yet. The total time and squared total time for the test are represented in 362 and 364 respectively. The number of transactions of this type performed by all threads so far is stored at 366. Average, standard deviation and throughput values are stored at 368, 370 and 372 respectively. Minimum, maximum and last values for the transaction times are stored at 374, 376 and 378 respectively. Finally, counts of transactions that fall within certain time ranges are stored at 380.

Figure 9:
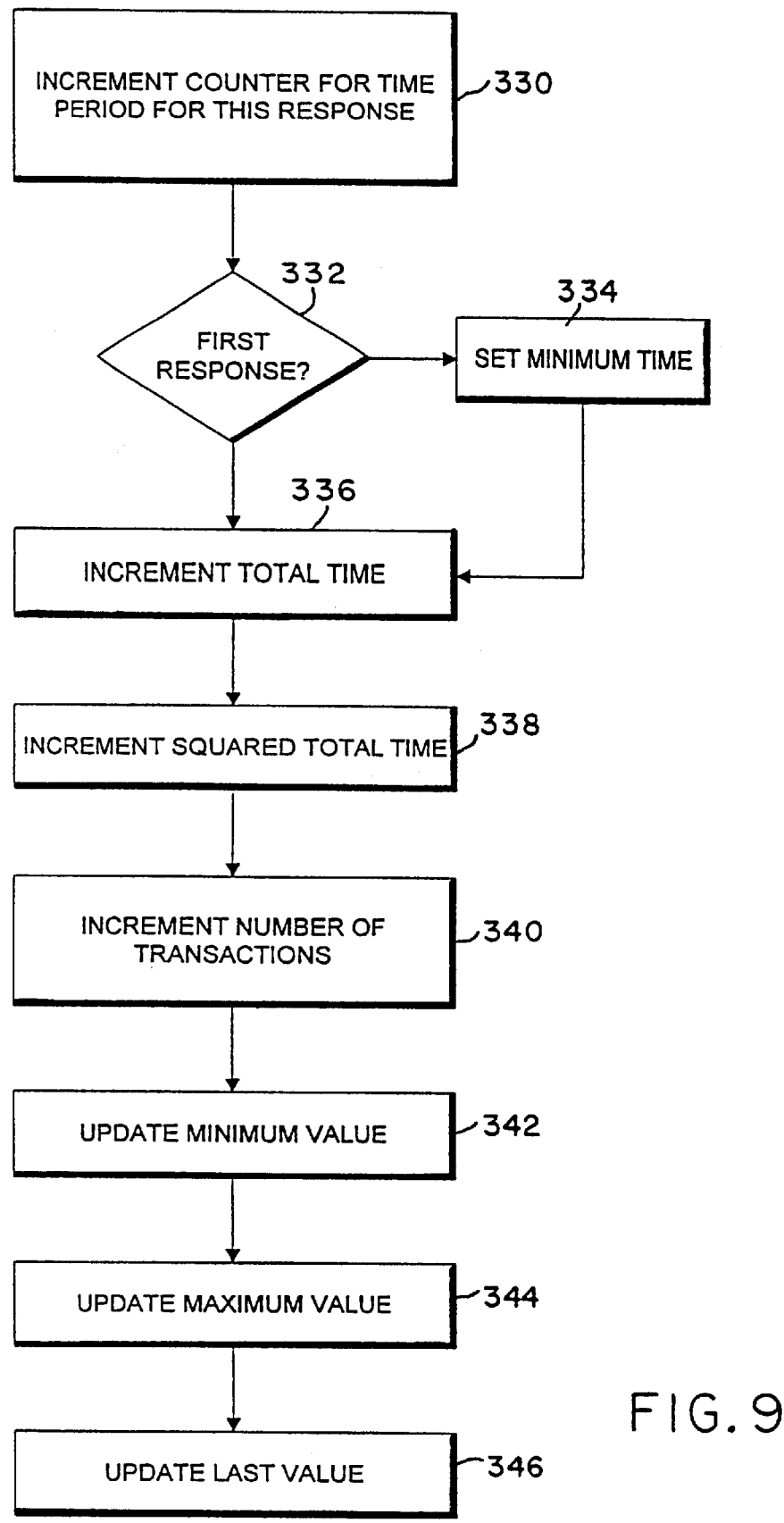
FIG. 9 is a flow chart describing how the statistics are updated for a given transaction.

Referring now to FIG. 9, a count is kept of the number of transactions that are completed within each of a set of certain time frames. A count is associated with each time frame and the count for the appropriate time frame 380 (FIG. 10) is incremented based upon the total transaction time of the operation in step 330. If this transaction is the first transaction, as determined in step 332 by examination of field 360 (FIG. 10), then the minimum transaction time 374 (FIG. 10) is set to the current transaction time in step 334. The total time 362 (FIG. 10) for tests of this type is then incremented in step 336. In step 338, the squared total time 364 (FIG. 10) is incremented in step 338. The number of transactions performed of this type 366 (FIG. 10) is then incremented in step 340. The minimum transaction time value 374 (FIG. 10) is then updated in step 342 and the maximum value 374 (FIG. 10) is updated in step 344. The last value 378 (FIG. 10) is also stored and is updated in step 346.

Using the process described above, the simulated users keep track of the statistics for each kind of operation that is applied to the server. These statistics data structures are compiled periodically by the main process, as part of the run time compilation, and output to a file. This file is read periodically by another thread or process that implements the graphical user interface to generate a display, such as shown above in connection with FIG. 3.

Figure 11:
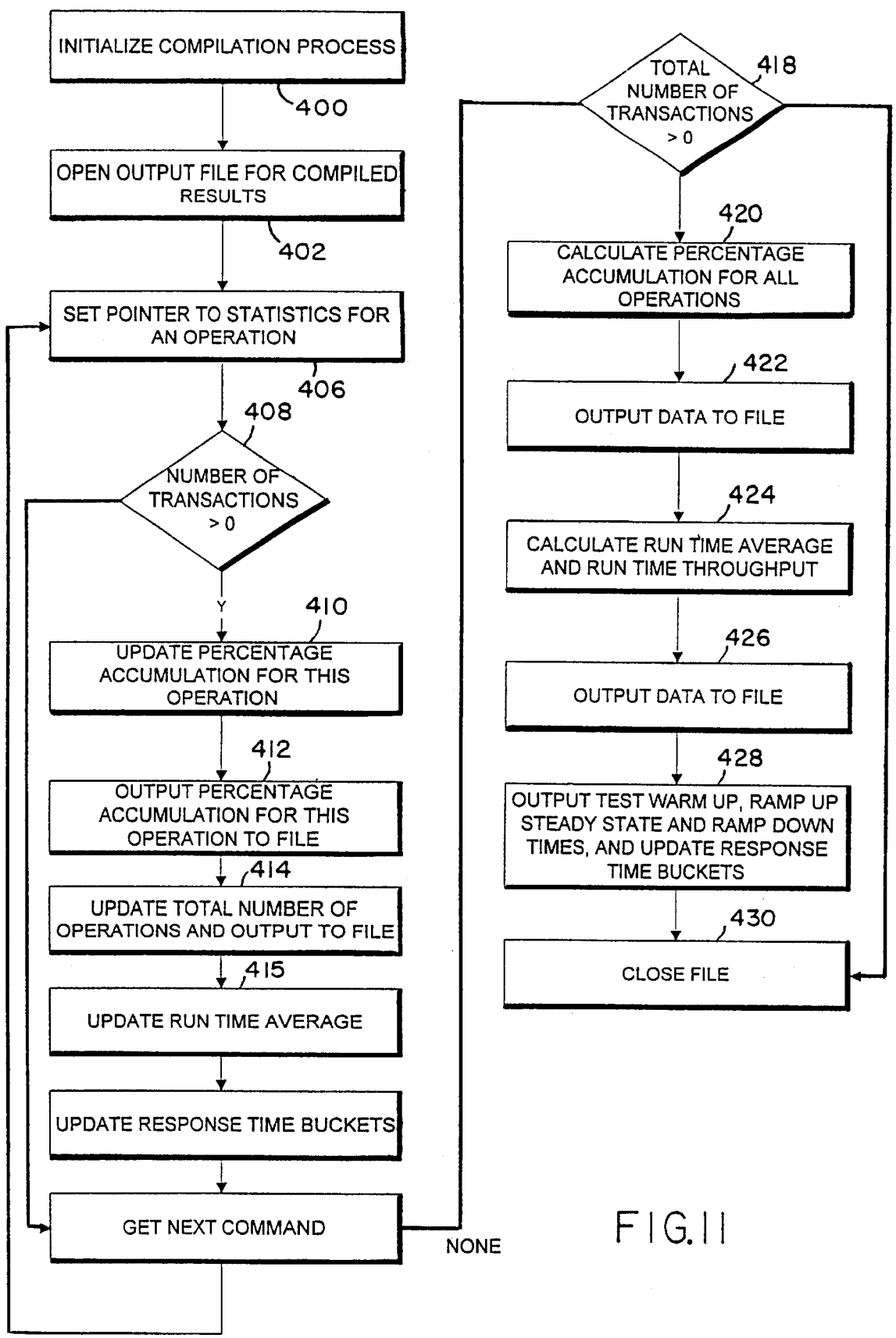
FIG. 11 is a flow chart describing the process of the run time compilation module.

The run time compilation of data for run time viewing of results on a graphical user interface is performed using the process of FIG. 11. This process uses the statistics data structures described above in connection with FIG. 10. First, the process is initialized in step 400 by setting a count value to zero. Run time average and percentage accumulation values are set to zero and the total number of all transactions that have been performed is set to zero. A current pointer for referencing a statistics data structure also is defined. A file for storing the compiled statistics is then opened in step 402. An error may be signaled to the user if this file open command does not complete successfully.

In this embodiment, each kind of operation has a corresponding number. This structure enables the compilation to be performed using a "while" loop. While the count value is less than or equal to the number of kinds of operations performed by the threads, the statistics for each of the kinds of operations are compiled. The statistics for the currently specified kind of operation are compiled by setting the current pointer to the statistics data structure for the current operation in step 406. If the number of transactions performed of this kind is non-zero, as determined in step 408, the percentage accumulation value for this operation is updated in step 410. This value may be calculated as the ratio of the number of transactions of the current type to the total number of commands of this type, multiplied by one hundred. This information for this operation is stored in the results file in step 412. The total number of all transactions is then updated by the number of transactions for current kind of given operation (366 in FIG. 10) in step 414. The run time is then updated by the total time (362 in FIG. 10) for this kind of operation in step 415. This value is merely cumulative temporarily. The actual run time average is computed in subsequent steps as described below. Response time buckets for each operation are then updated based on the values stored at 380 in FIG. 10. Steps 406 to 416 are repeated for all kinds of operations, as indicated at 417.

If the total number of all of the kinds of transactions performed (as incremented) is greater than zero, as determined in step 418, after compiling all the results for the different operations, the percentage accumulation value, for all operations, is then recomputed in step 420 and is output to the results file in step 422, along with an indication of the number of threads actually running and the number of threads specified to run. The percentage accumulation value may be computed as the ratio of the total number of all transactions performed to the total number of commands specified for the test, multiplied by one hundred. Next, the run time average, if greater than zero, is recomputed by dividing the current value (calculated in step 416) by the total number of all transactions, and multiplying by a thousand (step 424). The overall throughput also is calculated in the form of the total number of operations per unit time. These values are then output to the results file in step 426. Other information about the thread start time (when the first thread is initialized), warm up start time (when the test is started), warm up end time (when the last thread is initialized), steady state end time (when a first thread stops) and test completed time (when the last thread stops) also may be stored in the file. The ramp up time is the time from the test start time to the warm up end time. The ramp down time is the time from the steady state end time to the test completed time. The response time buckets over all operations also is compiled and output in step 429. The results file is then closed so that it may be accessed by the graphical user interface in step 420.

Figure 12:
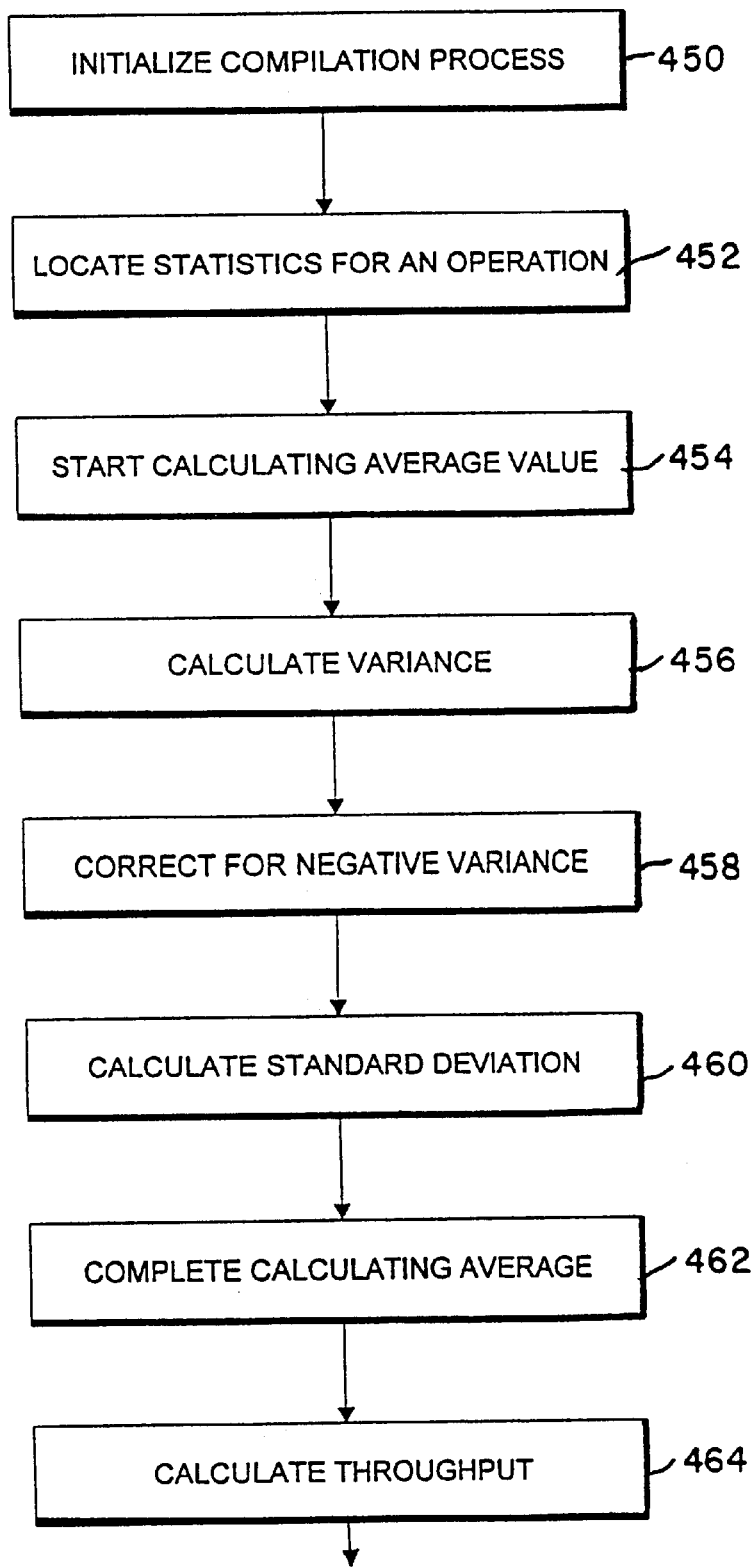
FIG. 12 is a flow chart describing the process of the end of test compilation module.

After the test terminates, additional statistical information may be generated from the statistics accumulated from the test. The termination of the test may occur by completion of the test, occurrence of an exception, i.e., error, during the test or by the user signaling a premature termination of the test. An example process for compiling appropriate statistics is shown in FIG. 12. This process parses the statistics data structures and compiles information about different operations performed on the server.

This process begins by initializing, in step 450, several variables for the compilation. For example, a pointer to the current statistics data structure for a specified operation is set. A variance is initialized to zero and a count value is initialized to one. Similar to the process described above in connection with FIG. 11, in this embodiment the total number of kinds of operations is used, in combination with a while loop that increments the count value to compile the results for each of the kinds of operations tested. For each count value, the statistics pointer is set to the statistics of data structure for the corresponding kind of operation in step 452. If the number of transactions for that kind of operation is greater than zero, the average, standard deviation and throughput values are calculated. These values are fields 368, 370 and 372, respectively in FIG. 10.

The computation of the average value is started by dividing the total time (362 in FIG. 10) by the number of transactions (366 in FIG. 10) in step 454. The variance is determined in step 456 by dividing the squared total time (364 in FIG. 10) by the number of transactions (366 in FIG. 10) then subtracting the square of the temporary average value computed in step 454. If the variance is less than zero it is multiplied by negative one in step 458 to correct the negative variance. In step 460, the square root of the variance times one thousand is computed to determine the standard deviation. The temporary average value is then multiplied by one thousand in step 462 to complete calculating the average value. The throughput is then computed in step 464 by dividing the number of transactions (366 in FIG. 10) by the difference between the operation end time and the operation start time, multiplied by sixty thousand.

These values (368, 370 and 372) are computed for each kind of operation to compile all of the results. The compiled values may be printed to a file or may be viewed through a graphical user interface. For example, each of the values computed may be presented in a spread sheet having a row for each operation type and a column for each value in the statistics data of structure.

Figure 13A:
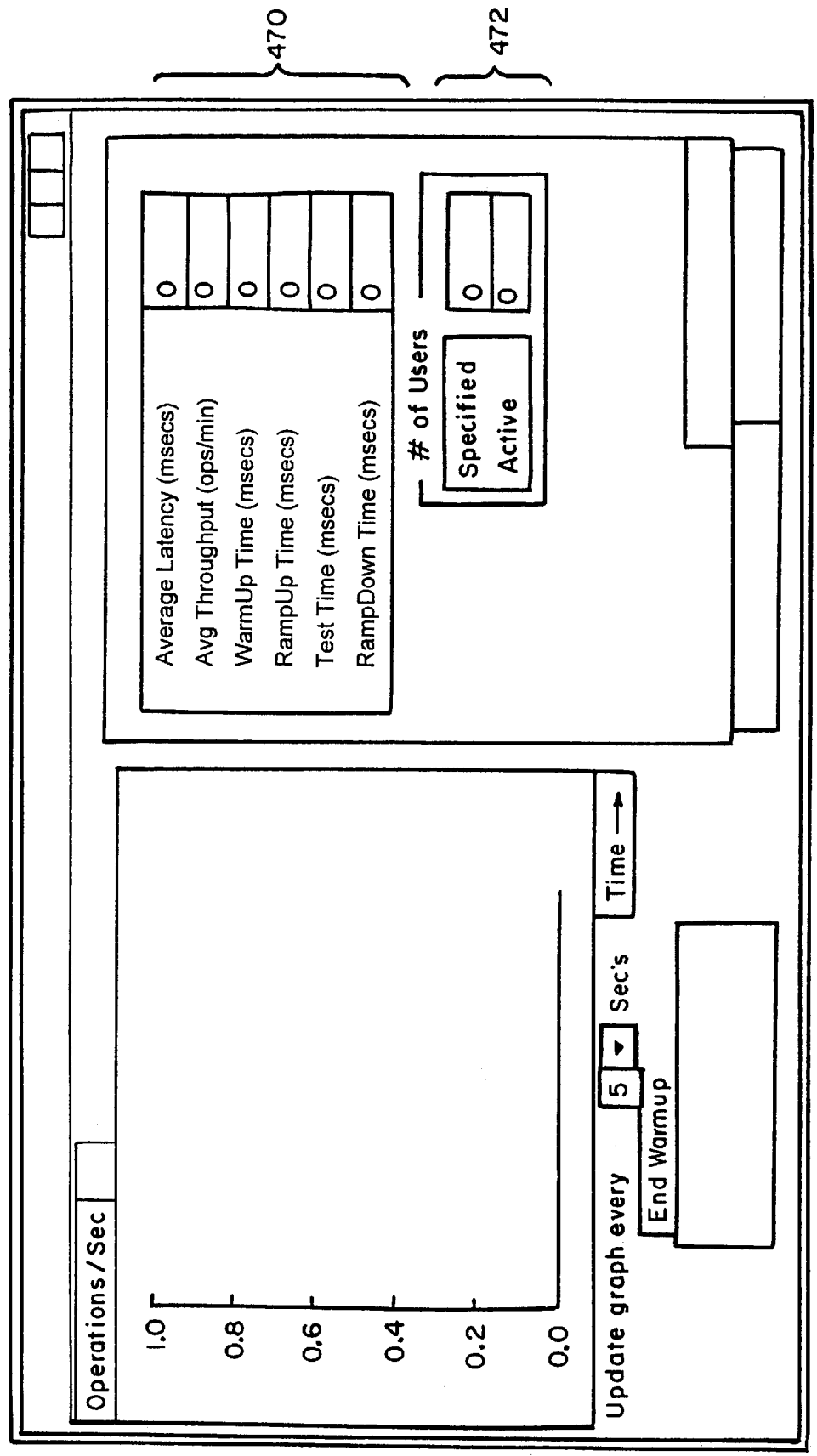
FIGS. 13A–13C show displays for viewing compiled test results.
Figure 13B:
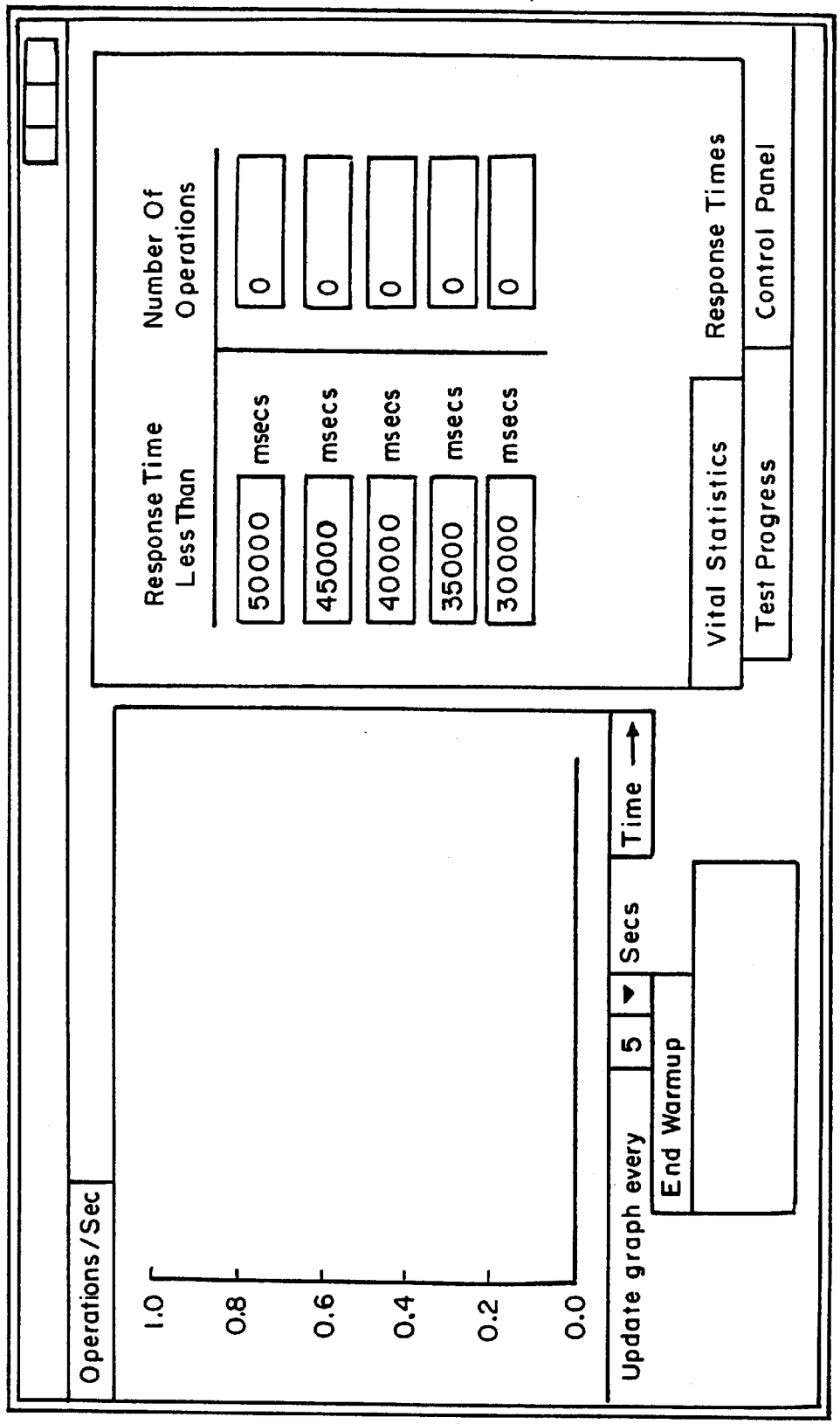
Figure 13C:
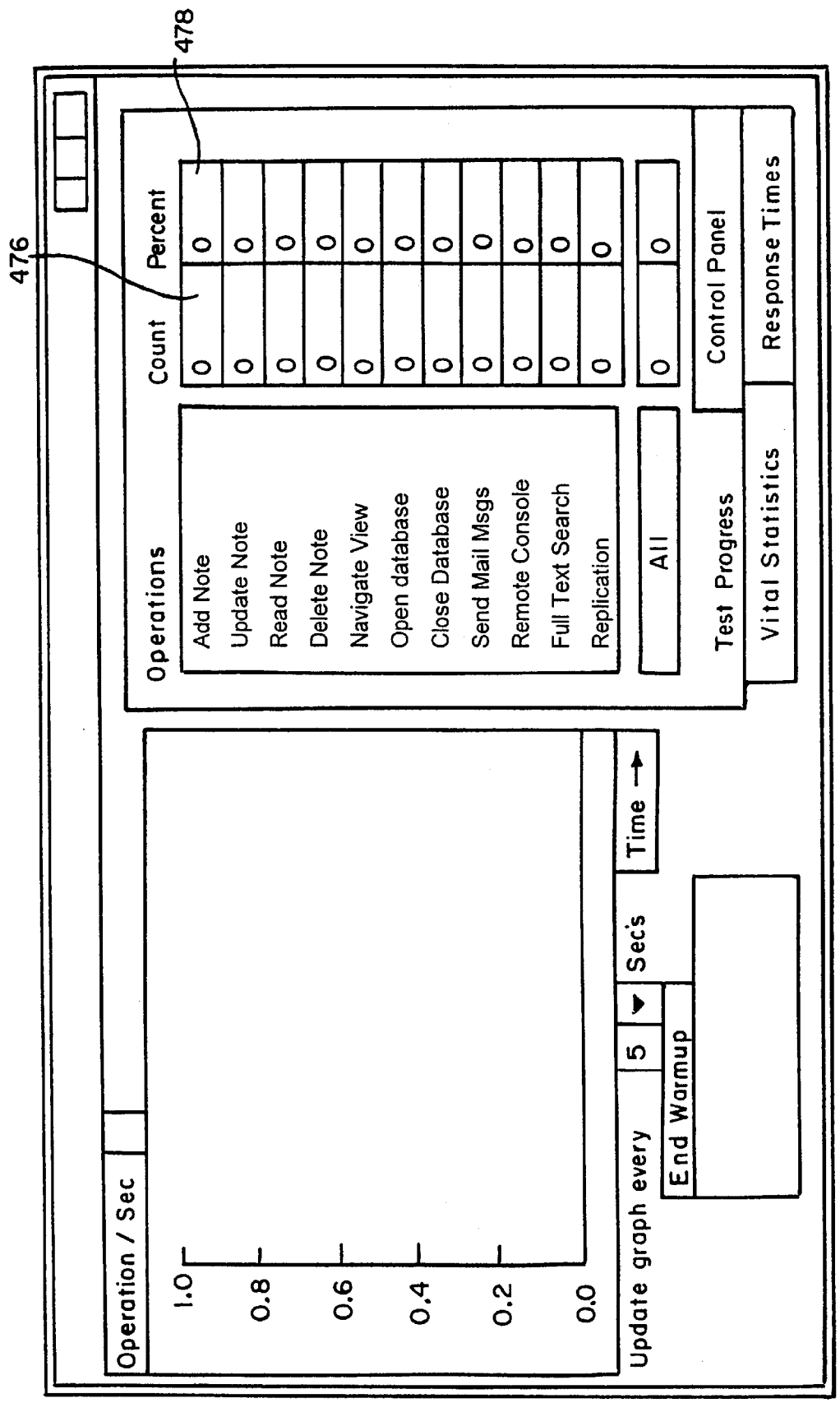

Example user interfaces for viewing the compiled test statistics are shown in FIGS. 13A through 13C. The average latency, average throughput, test warm up, ramp up, steady state and ramp down times may be shown in the user interface such as shown at 470 in FIG. 13A. The number of specified users and number of active users also may be displayed, as indicated at 472. Referring now to FIG. 13B, the compiled response time bucket information, corresponding to the compilation of values 380 (FIG. 10) over all operations, can be displayed, as indicated at 474. Referring to FIG. 13C, the total number of transactions and percentage accumulation values can be displayed, as indicated at 476 and 478, for each kind of operation that is available. Each of these user interfaces shown in FIGS. 13A through 13C may be selectable by the user. These displays also may be shown in combination with a graphical display such as shown above in connection with FIG. 3.

Using a system such as described above, acceptance criteria also may be defined during run time. Acceptance criteria are measures of performance of a system from the perspective of a user. Such criteria typically are part of a request for proposal (RFP) document for any mission critical application. Typically, whether a system meets acceptance criteria is determined by conducting experiments and storing all measured statistical data. An extensive statistical analysis usually is performed to understand if the experiment satisfies the necessary criteria. Also, all experiments need to be run to completion, which could result in extensive delays if experiments are lengthy.

Using the present invention, analysis of acceptance criteria may be conducted at run time, without post-test analysis. By using run time compilation of the test data, a test may be stopped automatically when acceptance criteria cannot be met. Both of these features may save significant time while conducting experiments.

The user input that defines acceptance criteria typically is in a form such as: "95% of operations have to be within a response time of 32 seconds and 85% of operations have to be within a response time of 28 seconds." Accordingly, a user interface may be provided to allow a user to input a percentile number and a response time number.

To implement this feature, a global data structure may be defined for the main test process, with a separate data structure for each thread representing each simulated user. For the sake of simplicity, the global data structures and algorithms will be described since the data structures and algorithms at the user level are similar. A data structure has, for each acceptance criterium, two values, representing response time values and associated percentile values. The data structure also includes a quantity which is a running count of operations which either satisfy or do not satisfy the acceptance specifications.

An example of this process is the following. Assuming the acceptance criteria noted above, the data structure is initialized with the running counts equal to zero, and the pairs of response time and percentile values of: 32 seconds, 95 percent; 28 seconds, 85 percent.

Each thread updates the running counts after each test. The main process periodically compiles the running counts. Each running count and the total number of operations is used to compute the actual percentage values, which are compared to the percentile values defining the acceptance criteria. The experiment is terminated when the number of operations that did not match the acceptance criteria exceeds the allowed percentage number.

Another capability that the present invention supports is the self-regulation of the number of simulated users during a test. For example, a test may start with a large number of users and drop down to whatever number of users the system can support over time. This feature is used to find out how many users can be supported on a given system. A typical approach is to conduct many experiments at incremental load intervals to determine the number of users that can be supported. This set of experiments could be extensive and hence very resource-intensive. Using the present invention, however, the number of users that can be supported can be discovered in a single test.

In one embodiment of the invention, this feature may be implemented by defining a global semaphore which instructs the run-time system that a user may be terminated based on some criteria. Examples of such criteria include response time timeout or errors. Other criteria also may be defined to be applied to information compiled during run time. In general, whenever an operation or set of operations for a user does not conform to specified criteria, the simulated user may be terminated. The simulation of the rest of the users continues.

One effect such self-regulation is that when several users are simulated on a system, the unsupportable users are automatically dropped, allowing the supportable users to complete the test. The number of active users may be presented as a run-time metric as well as a recorded metric at the end of the test.

Another benefit of the present invention is that experimental results may be logged into a database, rather than a mere data file. Each of the statistics data structures and the compiled results, the script files and other test parameters, may be written into different fields into a database. As a result, data from hundreds of experiments can be navigated with extreme ease to generate intelligence from them. Users could manipulate the data to compare tests and to perform other calculations on the test results.

By using a testing application such as the one described, it is possible to test systems as they actually would be used by users. For example, complex combinations of servers and applications may be tested simultaneously.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalent thereto.

What is claimed is:

1. A process for externally testing a computer system, comprising steps of:

issuing, over a period of time, a plurality of requests to the computer system;

receiving, over the period of time, a plurality of responses from the computer system corresponding to each of the plurality of requests;

monitoring an elapsed time between issuance of at least one request and receipt of at least one response corresponding to the at least one request and whether the at least one response was successful;

generating, at first intervals during the period of time, performance and reliability metrics for each at least one response based upon the step of monitoring; and compiling and displaying, at second intervals during the period of time, a summary of performance and reliability results based upon the performance and reliability metrics.

2. The process of claim 1, further comprising steps of:

establishing acceptance criteria related to the performance and reliability of results; and notifying a user when the performance and reliability of results fails to meet the acceptance criteria.

3. The process of claim 2, wherein the step of issuing the plurality of requests includes a step of simulating a plurality of users, each of which issue a request; and wherein the process further comprises a step of terminating simulation of one of the plurality of users when certain conditions occur in connection with a response corresponding to the request issued by the one of the plurality of users.

4. The process of claim 1, wherein the computer system includes a client and a server, and wherein the step of issuing the plurality of requests includes a step of issuing the plurality of requests to the server from the client.

5. The process of claim 4, wherein the step of receiving the plurality of responses includes a step of receiving, on the client, the plurality of responses of the server to the plurality of requests.

6. The process of claim 5, wherein the step of monitoring includes a step of performing the monitoring on the client.

7. The process of claim 1, wherein the computer system includes a plurality of clients and a server, and wherein the step of issuing the plurality of requests includes simulating a plurality of users on different clients that each issue at least one of the plurality of requests to the server.

8. The process of claim 1, further comprising steps of:
  establishing acceptance criteria related to the performance and reliability of results; and
  automatically terminating the testing of the computer system when the step of generating performance and reliability metrics indicates that the performance and reliability results cannot meet the acceptance criteria.

* * * * *